United States Patent
Hatano et al.

[11] Patent Number: 5,920,368
[45] Date of Patent: *Jul. 6, 1999

[54] COMPOSITE MATERIAL, DISPLAY DEVICE USING THE SAME AND PROCESS OF MANUFACTURING THE SAME

[75] Inventors: Takuji Hatano; Kiyofumi Hashimoto, both of Suita; Nobuyuki Kobayashi, Kobe, all of Japan

[73] Assignee: Minolta Co., Ltd., Osaka, Japan

[*] Notice: This patent is subject to a terminal disclaimer.

[21] Appl. No.: 08/984,166

[22] Filed: Dec. 3, 1997

Related U.S. Application Data

[62] Division of application No. 08/640,585, May 1, 1996, Pat. No. 5,731,861.

[30] Foreign Application Priority Data

May 2, 1995 [JP] Japan .................. H 7-108659

[51] Int. Cl.⁶ .................................................. G02F 1/137
[52] U.S. Cl. ........................... 349/169; 349/86; 349/176
[58] Field of Search ..................... 349/86, 88, 89, 349/177, 169, 175, 176, 183, 185, 188; 428/1; 430/20; 252/299.01, 299.5, 299.7

[56] References Cited

U.S. PATENT DOCUMENTS

| | | | |
|---|---|---|---|
| 5,200,845 | 4/1993 | Crooker et al. | 349/175 |
| 5,251,048 | 10/1993 | Doane et al. | 349/88 |
| 5,434,685 | 7/1995 | Pirs et al. | 349/88 |
| 5,437,811 | 8/1995 | Doane et al. | 252/299.01 |
| 5,493,430 | 2/1996 | Lu et al. | 349/106 |
| 5,570,216 | 10/1996 | Lu et al. | 349/175 |
| 5,661,533 | 8/1997 | Wu et al. | 349/169 |
| 5,674,576 | 10/1997 | Gotoh et al. | 349/169 |

OTHER PUBLICATIONS

D.K. Yang et al., "Cholesteric Reflective Display: Drive Scheme and Contrast", Appl. Phys. Lett 64 (15), Apr. 11, 1994, pp. 1905–1907.

*Primary Examiner*—Hung Xuan Dang
*Assistant Examiner*—Tai V. Duong
*Attorney, Agent, or Firm*—McDermott, Will & Emery

[57] ABSTRACT

A composite material includes a cholesteric liquid crystal; a polymer which is distributed in phase-separated domains and provides an effective form-retention property for the composite material; and an additional material which is dissolved in the cholesteric liquid crystal and maintains a cholesteric phase of the liquid crystal and bistability of a focal conic state and a planar state of the liquid crystal.

24 Claims, 3 Drawing Sheets

COMPOSITE MATERIAL, DISPLAY DEVICE USING THE SAME AND PROCESS OF MANUFACTURING THE SAME

This is a Divisional of U.S. patent application Ser. No. 08/640,585, filed May 1, 1996, now U.S. Pat. No. 5,731,861.

BACKGROUND OF THE INVENTION

1. Field of the Invention

The present invention relates to a composite material including a liquid crystal and a polymer.

The invention also relates to a display device using the above composite material.

Further, the invention relates to a process or method of manufacturing the composite material and the display device.

2. Description of the Related Art

In recent years, it has been proposed to use a composite material including a liquid crystal and a polymer as a liquid crystal material, e.g., for displaying characters and graphics. It has been expected that the composite material including a liquid crystal and a polymer can provide a bright liquid crystal panel of a large area, because such composite material does not require a polarizer and manufacturing of a cell.

For example, U.S. Pat. No. 5,437,811 has disclosed that the following composite material exhibits a memory effect. In this composite material, a chiral nematic liquid crystal made of a nematic liquid crystal and a chiral material added thereto is used as a liquid crystal (cholesteric liquid crystal) exhibiting a cholesteric phase, and a slight amount of polymer is added to the cholesteric liquid crystal.

When a low voltage in a pulse-form is applied to a liquid crystal cell, in which such cholesteric liquid crystal and polymer are retained between two transparent plates, through electrically conductive transparent films arranged inside the respective plates, a focal conic orientation, i.e., a phenomenon that helical axes of liquid crystal molecules are irregularly directed occurs, so that the incident light is scattered, resulting in an opaque appearance of the liquid crystal. When a high voltage in a pulse-form is applied, the helical axes of liquid crystal molecules are oriented vertically with respect to the plates and thus form the planar orientation, so that the liquid crystal exhibits a transparent appearance. These two states are maintained stably, and in other words, bistability of these states is maintained even after the voltage application is terminated. It has been considered that the bistability is achieved owing to the fact that the polymer restricts movement of the liquid crystal.

The above composite material requires no memory elements such as TFT and MIM and has been paid attentions to as an element for providing a high-precision display device.

Meanwhile, a cholesteric liquid crystal in the planar orientation selectively reflects light having a wavelength, which corresponds to the product of a helical pitch length and an average refractive index or refractivity of the liquid crystal, and thereby attains a colored transparent state. Therefore, it has been attempted to use the cholesteric liquid crystal for providing a color display.

However, the selective reflection wavelength of the cholesteric liquid crystal sensitively changes depending on a temperature and a viewing angle, and thus it is difficult to maintain the cholesteric liquid crystal at a constant color.

As one of pleasures for overcoming the above problem, such a cholesteric liquid crystal may be used that the selective reflection wavelength is, for example, in the infrared range, as disclosed in U.S. Pat. No. 5,437,811. Thereby, the cholesteric liquid crystal allows transmission of visible light to exhibit a transparent appearance, and it is possible to prevent an influence on light scattering and transmitting characteristics of the liquid crystal in a visible range even when the selective reflection wavelength of the liquid crystal changes due to change of the helical pitch length depending on a temperature and/or the viewing angle of the liquid crystal. Further, it is possible to provide a two-color display such as white and black display by utilizing background color as well as two states, i.e., transparent and opaque states, which can be achieved by adjusting the selective reflection wavelength of the liquid crystal to be in a range (e.g., an infrared range) outside the visible range.

However, when the selective reflection wavelength is set, e.g., in the infrared range, such a problem arises that a contrast decreases in accordance with increase of the helical pitch length. More specifically, the liquid crystal itself generally exists as a flowable material, so that the composite material must have a hardness (form retention property) to an extent allowing retention of the form, for example, in order to facilitate handling of the liquid crystal as a display element. If an addition rate of the polymer is increased for ensuring the form retention, a transmittance or transmission factor of visual rays in the planar orientation or state decreases in accordance with increase of the helical pitch length, resulting in reduction of contrast.

SUMMARY OF THE INVENTION

An object of the invention is to provide a novel and useful composite material overcoming the above problems as well as a display device using the same.

Another object of the invention is to provide a composite material having a memory effect and achieving a high contrast as well as a display device using the same.

Still another object of the invention is to provide a composite material, in which an influence of a viewing angle and a temperature on light scattering and transmitting characteristics is suppressed, as well as a display device using the same.

Yet another object of the invention is to provide a composite material having a simple structure as well as a display device using the same.

Further another object of the invention is to provide a composite material allowing area-increase as well as a display device using the same.

A further object of the invention is to provide a composite material allowing bright display as well as a display device using the same.

A still further object of the invention is to provide a composite material having a superior form retention property as well as a display device using the same.

It is further an object of the invention to provide a method or process of manufacturing a novel and useful composite material overcoming the above problem as well as a method or process of manufacturing a display device using the composite material.

A further object of the invention is to provide a method of manufacturing a composite material overcoming the above problems by easy processing as well as a method of manufacturing a display device using the composite material by easy processing.

A further object of the invention is to provide a method of manufacturing a composite material in which a liquid crystal and a polymer are dispersed uniformly.

In order to achieve the above objects, the inventors of the present invention have made a research to obtain the following knowledge.

In a composite material containing a cholesteric liquid crystal and a polymer, an additional material which is soluble with the cholesteric liquid crystal can be used to improve a transmitting factor or transmittance in a transparent state achieved by a planar orientation and to obtain a high contrast, even if a selective reflection wavelength of the cholesteric liquid crystal is in a range such as an infrared range outside a visible light wavelength range and the content of the polymer is large. Also, a sufficient transmittance can be obtained without an influence on a light modulation performance (light scattering and transmitting performance) in a visible range, even when a helical pitch length of the cholesteric liquid crystal changes due to change of a temperature and/or a viewing angle changes.

The invention has been developed based on the above knowledge, and provides a composite material comprising a cholesteric liquid crystal, a polymer which is distributed in phase-separated domains and provides an effective formretention property for the composite material, and an additional material which is dissolved in the cholesteric liquid crystal and maintains a cholesteric phase of the liquid crystal and bistability of a focal conic state and a planar state of the liquid crystal.

The present invention also provides a process of producing a composite material comprising the steps of mixing a cholesteric liquid crystal, a fluid material for a polymer and an additional material which is soluble with the cholesteric liquid crystal and maintains a cholesteric phase of the liquid crystal and bistability of a focal conic state and a planar state of the liquid crystal; and subsequently producing a polymer from the fluid material contained in the mixture to distribute the polymer in phase-separated domains, wherein the polymer provides an effective form-retention property for the composite material.

The foregoing and other objects, features, aspects and advantages of the present invention will become more apparent from the following detailed description of the present invention when taken in conjunction with the accompanying drawings.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
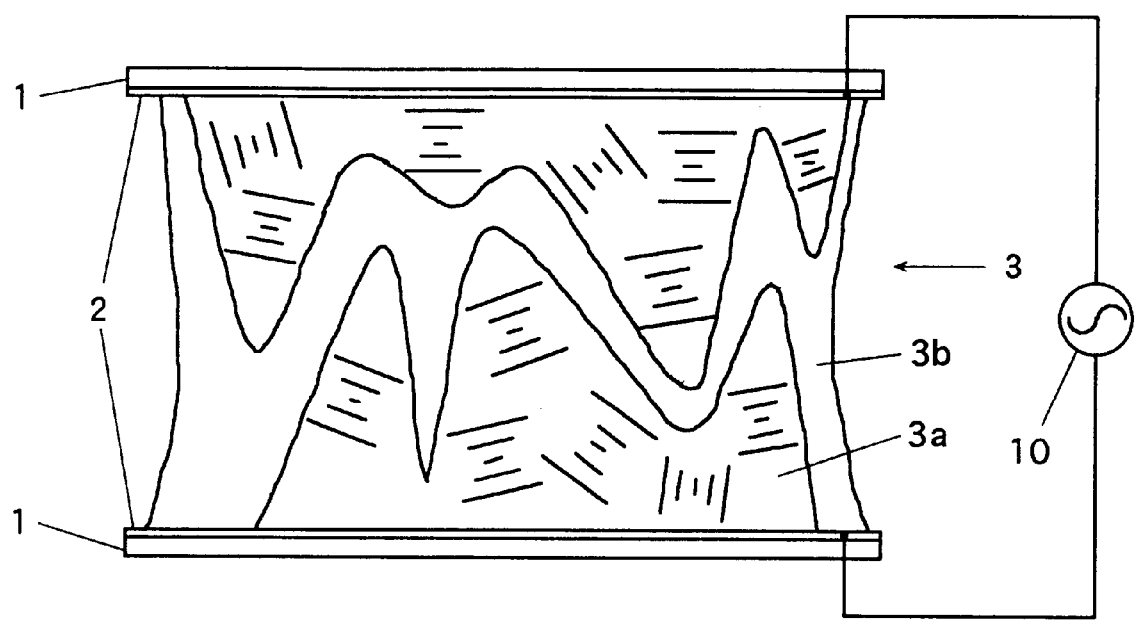
FIG. 1 is a schematic view showing a liquid crystal display device using a composite material made of a liquid crystal and a polymer.

According to a preferred embodiment of the invention, a composite material includes a cholesteric liquid crystal, a polymer which provides an effective form-retention property for the composite material, and an additional material which is soluble in the cholesteric liquid crystal and maintains a cholesteric phase of the liquid crystal and bistability of a focal conic state and a planar state of the liquid crystal.

The liquid crystal forming the composite material may be any of liquid crystals exhibiting a cholesteric phase. More specifically, it may be not only the cholesteric liquid crystal but also other liquid crystals such as a chiral nematic liquid crystal including a nematic liquid crystal and a chiral material added thereto. Particularly, it is preferable that the liquid crystal forming the composite material exhibits a cholesteric phase at a room temperature. By using a cholesteric liquid crystal of which selective reflection wavelength is in a range such as an infrared range outside a visible light range, when the liquid crystal attains a planar state or orientation, the composite material can transmit the risible light and thus a transparent state can be achieved.

The polymer forming the composite material may be selected from various known polymers provided that the polymer is distributed in phase-separated domains, i.e., it is phase-separated from the liquid crystal, and does not impair an operation of a display element including the composite material. As will be described later, however, it is preferable to use a polymer which is made from a polymerizable material such as a polymerizable monomer in view of the fact that the composite material can be produced simultaneously with formation of the polymer. As an appropriate example of the polymer made from the polymerizable material, a polymer made from a material for a polymer which is commercially available as a photo-curing resin may be used.

In this case, the polymer is appropriately prepared by adding a photo-polymerization initiator, which absorbs light of a particular wavelength to generate radicals, to a polymerizable material such as a polymerizable monomer, polymerizable oligomer or polymerizable prepolymer, and then irradiating light thereto to cause photo-polymerization for forming the polymer.

The content of the polymer in the composite material is determined to provide the composite material with a sufficient form-retention property, and preferably is set to 10 wt % (% by weight) or more with respect to the whole weight of the composite material. More preferably, it is set to 15 wt % or more. The maximum value of the content of the polymer is not specifically restricted, but is preferable about 30 wt % in order to suppress rising of a necessary drive voltage and to ensure a sufficient contrast.

The additional material soluble with the liquid crystal may be selected from various materials provided that it does not impair the operation of the display element including the composite material. For example, the polymerization initiator, of which primary purpose is to produce the polymer forming the composite material, may be the additional material. In this case, the polymerization initiator may be added to be present in an amount excessively larger than the amount required for production of the polymer. Further, as will be described later, such a material may be used as the additional material that keeps apart from production of the polymer in and after the processing of producing the polymer subsequent to mixing thereof with the material for the polymer used for obtaining the polymer forming the composite material.

The content of the additional material depends on the types of the liquid crystal and the polymer as well as a mixing ratio of them, and is not specifically restricted.

However, the content of the additional material, i.e., a rate thereof with respect to the whole materials is preferable 1 wt % to 6 wt %. If the content of the additional material is at least 1 wt %, the addition of the additional material can achieve a sufficient effect, and it is also possible to perform sufficient polymerization even if the polymerization initiator for producing the polymer from the polymerizable material is also used as the additional material. The content of 6 wt % or less maintains a cholesteric phase of the liquid crystal and bistability of the liquid crystal. The allowable upper limit of the content of the additional material can be appropriately determined in view of the foregoing as well as a transmittance of the composite material in a transparent state, light scattering characteristics (a scattering angle and an extent or degree of backward scattering) in a scattered state, a state of use of the composite material in the display element (e.g., a projection type or a reflection type) and others.

By using the additional material, which is soluble with the cholesteric liquid crystal and will be present in an amount within a range maintaining the cholesteric phase of the liquid crystal and the bistability of the liquid crystal, the transmittance of the cholesteric liquid crystal in a transparent state achieved by a planar state can be improved, and thus a contrast can be high even in the case where the selective reflection wavelength of the liquid crystal is set in an infrared range, regardless of the fact that the content of the polymer is increased to an extent allowing the liquid crystal to exhibit a sufficient form-retention property. For example, white and black display utilizing a background color can be performed with a high contrast.

A process or method of manufacturing the composite material is not particularly restricted, but such a process may be employed that the cholesteric liquid crystal, a fluid material for the polymer such as a polymerizable monomer, required polymerization initiator and the additional material which is soluble with the cholesteric liquid crystal are mixed together, and then the polymer is produced from the fluid material contained in the mixture, e.g., by irradiating light to the mixture for photo-polymerization. In the composite material thus produced, the polymer is distributed in phase-separated domains, i.e., the liquid crystal and the polymer are phase-separated from each other.

In this manner, the polymer is produced after mixing the materials, whereby it is possible to improve the dispersion uniformity of the liquid crystal and the polymer.

In the case where the composite material is produced by using the polymerizable material as the material for the polymer, it is preferable to use the polymerization initiator also as the additional material, because this improves the concentration uniformity of the additional material which is dissolved in liquid crystal domains distributed in the composite material. In this case, the amount of the polymerization initiator is excessively larger than a minimum required amount allowing polymerization of the polymerizable material, and the total amount of the polymerization initiator is within the above range.

Instead of the manner of adding the polymerization initiator excessively larger in amount than the amount required for production of the polymer, such a manner may be employed that only a required amount of the polymerization initiator, i.e., the initiator of an amount not excessively larger than the amount required for production of the polymer is added, and an additional material, which is different from the polymerization initiator and is soluble with the liquid crystal, is also used. The above additional material may be a polymerizable material such as a polymerizable monomer. When the polymerizable material is used, the polymer can be produced after mixing the additional material with the polymerizable material from which the polymer forming the composite material is obtained, but it is preferable to use the material which does not participate in production of the polymer. For example, if the fluid material for the polymer allows phase-separation by radical polymerization, a monomer component allowing cation polymerization or anion polymerization may be used. It is preferable to use such a material that has an optically isotropy and does not exert a strong influence on properties of the liquid crystal.

FIG. 1 shows a liquid crystal display device of a transparent type which uses a composite material including a liquid crystal and a polymer. This liquid crystal display device includes a pair of transparent plates 1 and transparent electrically conductive films 2, which are in close contact with the inner faces of the plates 1, respectively. This liquid crystal display device also includes a composite material 3. The composite material 3 is sandwiched between the films 2 and contains a liquid crystal 3a exhibiting a cholesteric phase at a room temperature and having a selective reflection wavelength in an infrared range. The liquid crystal 3a is dispersed in a resin 3b. This liquid crystal display device is not provided with a memory element such as a TFT or a MIM, and is driven in a simple-matrix driving manner. One of the conductive plates composed of the plates 1 and the conductive films 2 arranged on the inner faces of the plates 1 may be opaque provided that the other is transparent.

The liquid crystal display device is manufactured through the following steps (1)–(3).

(1) The pair of transparent plates 1 covered with the transparent conductive films 2 are held in an assembled position with an unillustrated spacer therebetween. In this assembled position, the conductive films 2 are opposed to each other. A pulse power source 10 is connected to the transparent conductive films 2 for selectively applying two kinds of, i.e., high and low pulse voltages across the two transparent conductive films 2.

(2) A cholesteric liquid crystal, a fluid (i.e., flowable) material for a polymer, a polymerization initiator added if necessary, and an additional material which is soluble in the cholesteric liquid crystal are mixed together.

(3) A space between the transparent plates. 1 is filled with a mixture produced in the above step.

(4) A polymer is produced from the fluid material and is distributed in phase-separated domains, i.e., is phase-separated from the liquid crystal, for example, by irradiating light through one of the plates to cause photo-polymerization. In this manner, the composite material 3 held between the transparent plates 1 is produced. In this state, helical axes of the cholesteric liquid crystal 3a are oriented irregularly, so that the liquid crystal 3a scatters visible light to exhibit an opaque appearance. The additional material (e.g., the surplus polymerization initiator if it is to be used as the additional material) exists in a state that it is dissolved in the cholesteric liquid crystal 3a.

In this liquid crystal display device, when the pulse power source 10 applies a high pulse voltage to the composite material 3 through the conductive films 2, the helical axes of the liquid crystal 3a, which were irregularly oriented in an initial state, are oriented vertically to attain the planar orientation or state, so that it allows transmission of light to exhibit a transparent appearance. When a low pulse voltage is applied to the composite material 3 in this state, the uniform orientation of helical axes is lost, and the helical axes are oriented irregularly to form a focal conic orientation, so that the composite material 3 scatters light of a wavelength in a visible range to exhibit an opaque appearance. These two states are maintained even after the pulse voltage supply is terminated, and thus bistability is achieved.

The composite material 3 contains the additional material, which is compatible with the cholesteric liquid crystal 3a and is present in an amount within a range that maintains the cholesteric phase of the liquid crystal 3a and its bistability. Therefore, the liquid crystal 3a having a selective reflection wavelength in an infrared range can have an improved transmittance of visible light when it maintains the planar orientation. Even if the helical pitch length is long, reduction of the transmittance is suppressed, and a high contrast can be attained.

More specific description will be given below in connection with experimental examples.

EXPERIMENTAL EXAMPLE 1

For liquid crystal display devices each having the structure shown in FIG. 1, an experiment was made to determine an influence of a magnitude of the helical pitch length of the cholesteric liquid crystal exerted on the transmittance of visible light. Change of the helical pitch length causes change of the selective reflection wavelength.

A pair of glass plates covered with ITO films, i.e., electrically conductive transparent films were positioned to hold a spacer of 10um in width therebetween with the transparent conductive films opposed to each other. The transparent conductive films are connected to the pulse power source 10 for selectively apply two kinds of (i.e., high and low) pulse voltages across the transparent conductive films.

Three kinds of chiral nematic liquid crystals each having the selective reflection wavelength of 0.55 $\mu$m, 1.0 $\mu$m or 1.5 $\mu$m were prepared by adding various amounts of chiral dopant S-811 (manufactured by Merck Co.) to cyanobiphenyl-contained nematic liquid crystal E31LV (manufactured by Merck Co.) exhibiting a nematic phase at a room temperature.

Each of the cholesteric liquid crystals thus prepared was mixed with ultraviolet-curing resin R128H (manufactured by Nippon Kayaku Co.) at a weight ratio of 80:20, and photo-polymerization initiator DAROCUR 1173 (manufactured by Ciba-Geigy Co.) at 0.6 wt % with respect to the whole weight is added and mixed.

The mixture thus obtained was applied between the paired glass plates, and ultraviolet rays were irradiated at 15 mw/cm² thereto for photo-polymerization. In this manner, the ultraviolet-curing resin was cured and phase-separation was caused, whereby three kinds of liquid crystal display devices were prepared.

All of these three kinds of liquid crystal display devices attained a transparent state when they were supplied with a pulse voltage of 100 V and 10 msec, and attained a white opaque state when they were supplied with a pulse voltage of 50 V and 10 msec. It was ensured that these states were held even when the voltage was not applied thereto.

A transmittance in a visible light transmitting state was measured for each of the liquid crystal display devices. The measurement of the transmittance was performed in such a manner that He—Ne laser was irradiated toward one side of the glass plate pair. A photodiode was arranged at a position spaced by 15 cm from the other side of the glass plate pair, and an output of its photoreceptor was measured.

Figure 2:
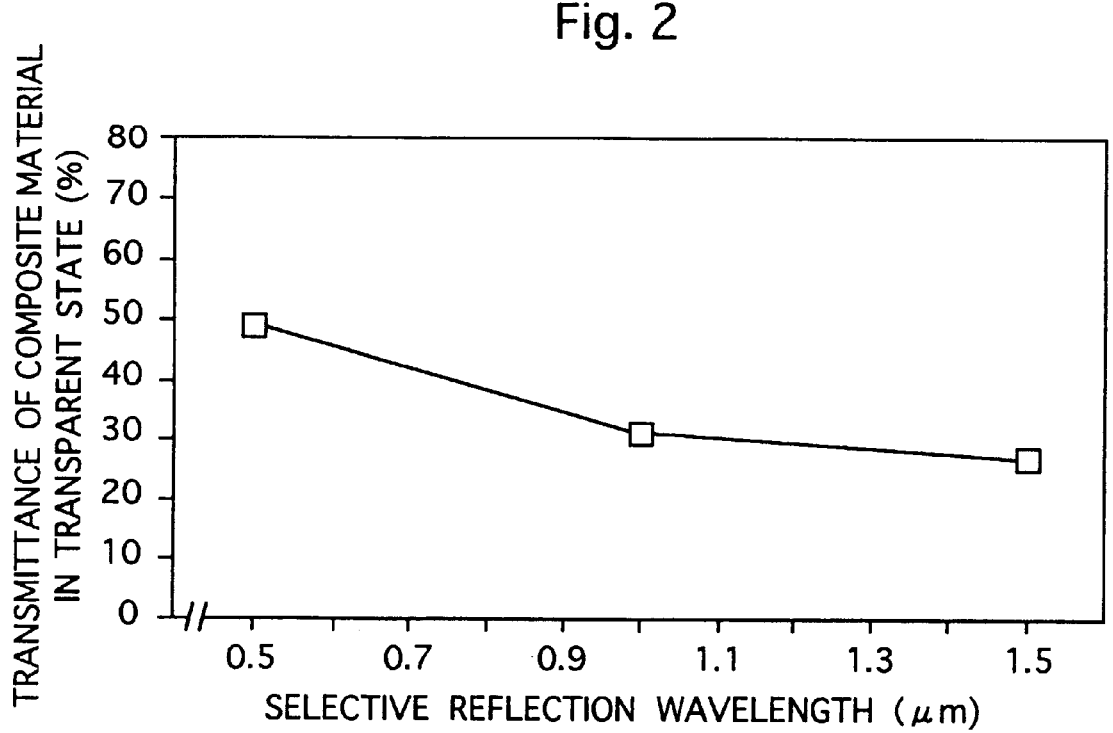
FIG. 2 shows a magnitude of influence of a helical pitch length of a cholesteric liquid crystal on a transmittance of a composite material in a transparent state.

Results of the measured transmittance are shown in FIG. 2. As can be seen from FIG. 2, even if the selective reflection wavelength is set in an infrared range for improving change of light modulation characteristics in a visible range due to change of a temperature, the transmittance decreases in accordance with increase of the helical pitch length, i.e., in accordance with increase of the selective reflection wavelength, and the transmittance of a sufficient value may not be achieved.

EXPERIMENTAL EXAMPLE 2

For liquid crystal display devices each having the structure shown in FIG. 1, an experiment was made to determine an influence of a content of the photo-polymerization initiator exerted on the transmittance of visible light.

A chiral nematic liquid crystal having a selective reflection wavelength of 1.1 $\mu$m was prepared by adding chiral dopant S-811 (manufactured by Merck Co.) to nematic liquid crystal E31LV (manufactured by Merck Co.).

The chiral nematic liquid crystal thus prepared was mixed with ultraviolet-curing resin R128H (manufactured by Nippon Kayaku Co.) at a weight ratio of 83:17. Six kinds of liquid crystal display devices were prepared by adding thereto photo-polymerization initiator DAROCUR 1173 (manufactured by Ciba-Geigy Co.) at 0.6 wt %, 1 wt %, 2 wt %, 3.8 wt %, 5.7 wt % and 7.4 wt % respectively with respect to the whole weight, and then performing photo-polymerization to cause phase-separation similarly to the manner of the experimental example 1.

In each of the composite materials of the display devices, the chiral nematic liquid crystal and the polymerization initiator were sufficiently dissolved in each other. Spectrometry was effected on the liquid crystals contained in the composite materials after phase separation, and it was confirmed that the liquid crystals containing the polymerization initiators at 0.6 wt % to 5.7 wt % with respect to the whole weight could perform selective reflection of light of a wavelength corresponding to the set selective reflection wavelength, and exhibited the cholesteric phase. The liquid crystal containing polymerization initiator at 7.4 wt % with respect to the whole weight did not exhibit the cholesteric phase, but exhibited an isotropic phase.

Figure 3:
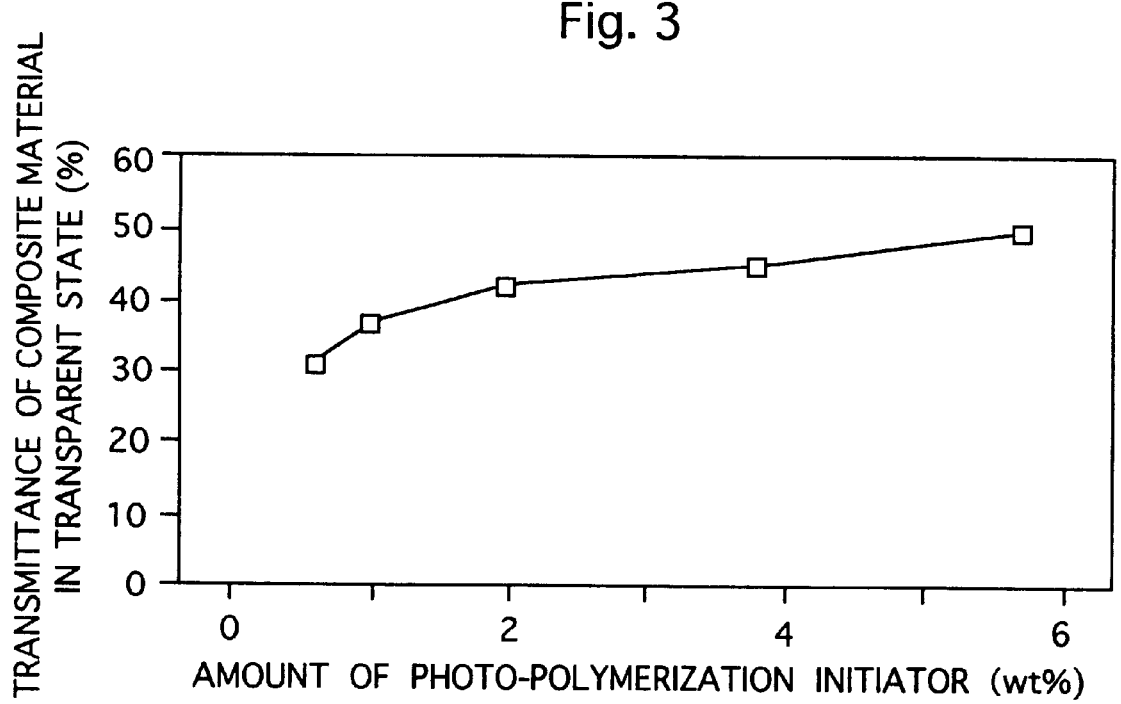
FIG. 3 shows a magnitude of influence of an amount of a photo-polymerization initiator on a transmittance of a composite material in a transparent state.

Transmittances of visible light of the respective devices in the transparent state were measured with He—Ne laser similarly to the manner of the experimental example 1. The results are shown in FIG. 3. It can be understood that the transmittance in the transparent state was improved in accordance with increase of the content of the polymerization initiator. However, the device containing 7.4 wt % initiator did not attain the scattered state and remained at the transparent state after irradiation of ultraviolet rays, and change by application of the pulse voltage was not recognized.

EXPERIMENTAL EXAMPLE 3

An experiment similar to the experimental example 2 was performed with different kinds of liquid crystals.

Chiral dopant S-811 (manufactured by Merck Co.) was added to tolane nematic liquid crystal MN1000XX (manufactured by Chisso Co., $\Delta n=0.219$, $T_{N-I}=69.9°$ C., $V_{90}=2.29$ V, $\eta_{20}=30.6$ CPS) which contains fluorine and exhibits a nematic phase at a room temperature, whereby a chiral nematic liquid crystal having a selective reflection wavelength of 1um was prepared. $\Delta n$ represents a refractive index measured with d-ray (of 589 nm in wavelength) of a mercury lamp. $T_{N-I}$ represents a temperature at which change from a liquid crystal phase to an isotropic phase occurs during rising of a temperature, and thus represents a phase transition temperature. $V_{90}$ represents a voltage at which the transmittance exceeds 90%. $\eta_{20}$ represents a viscosity at 20° C.

The chiral nematic liquid crystal thus prepared was mixed with ultraviolet-curing resin R128H (manufactured by Nippon Kayaku Co.) at a weight ratio of 80:20. Five kinds of liquid crystal display devices were prepared by adding thereto photo-polymerization initiator DAROCUR 1173 (manufactured by Ciba-Geigy Co.) at 0.6 wt %, 1 wt %, 2 wt %, 3.8 wt % and 5.7 wt % respectively with respect to the whole weight, and then performing photo-polymerization to cause phase-separation similarly to the manner of the experimental example 1.

Also in this experimental example, the chiral nematic liquid crystal and the polymerization initiator were sufficiently dissolved in each other. It was confirmed by spectrometry that the liquid crystals maintained the cholesteric phase even after the phase-separation.

Figure 4:
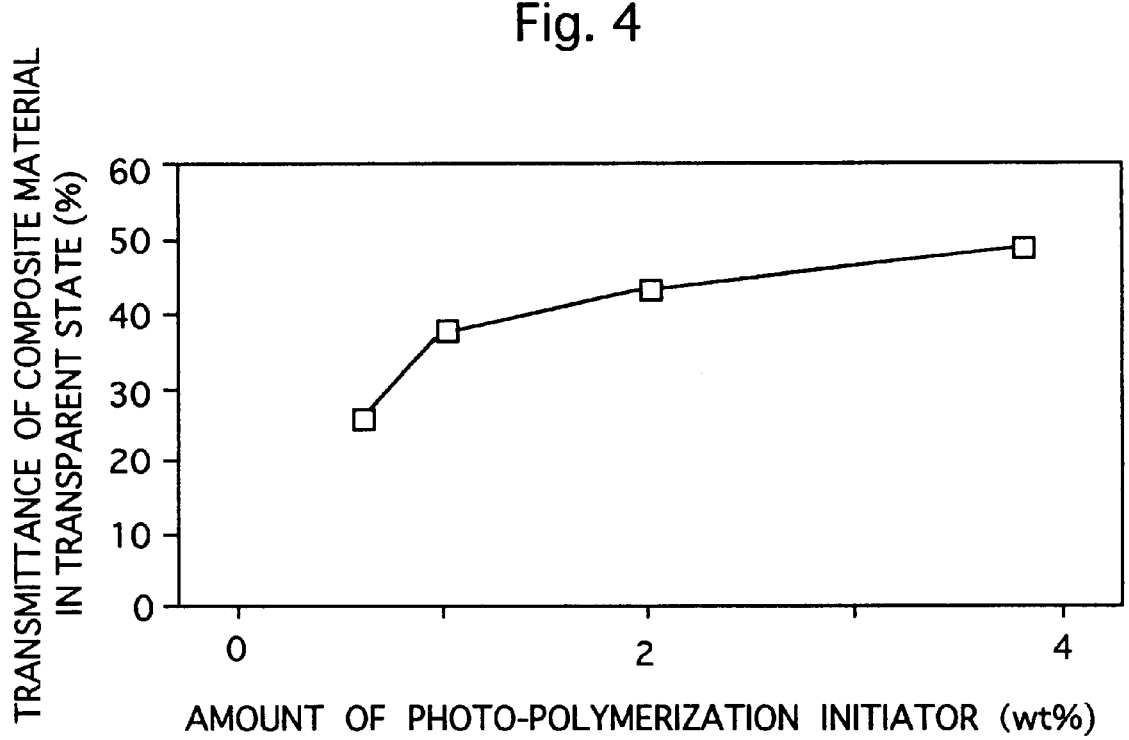
FIG. 4 shows a magnitude of influence of an amount of a photo-polymerization initiator on a transmittance of a composite material in a transparent state.

Transmittances of visible light of the respective devices in the transparent state were measured similarly to the manner of the experimental example 1. The results are shown in FIG. 4. It can be understood that the transmittance in the transparent state was improved in accordance with increase of the content of the polymerization initiator. However, the device containing 5.7 wt % initiator did not attain the scattered state and remained at the transparent state after irradiation of ultraviolet rays, and any change by application of the pulse voltage was not recognized.

From the above results, it can be understood that the transmittance in the transparent state is improved by adding an excessive amount of photo-polymerization initiator, which is larger than the amount (about 0.6 wt % with respect to the whole weight of the composite material) required for initiating photo-polymerization of the resin material for the polymer, but addition of an excessively large amount of initiator prevents the device from attaining the two states, i.e., scattered and transparent states. Probably, this is due to the fact that the polymerization initiator dissolved in the liquid crystal affects to reduce an average refractive index of the liquid crystal and improves the transmittance, but an excessive amount of polymerization initiator changes the liquid crystal from the cholesteric phase to the isotropic phase.

EXPERIMENTAL EXAMPLE 4

An experiment similar to the experimental example 3 was performed with different kinds of additional material soluble with the cholesteric liquid crystal.

Chiral dopant S-811 (manufactured by Merck Co.) was added to tolane nematic liquid crystal MN1000XX (manufactured by Chisso Co.) containing fluorine and exhibiting a nematic phase at a room temperature, whereby a chiral nematic liquid crystal having a selective reflection wavelength of 1um was prepared.

The chiral nematic liquid crystal thus prepared was mixed with ultraviolet-curing resin R128H (manufactured by Nippon Kayaku Co.), which contained 3 wt % photopolymerization initiator DAROCUR 1173 (manufactured by Ciba-Geigy Co.), at el weight ratio of 83:17. Five kinds of liquid crystal display devices were prepared by adding to the mixture thus prepared alicyclic epoxy resin CY179 (manufactured by Ciba-Geigy Co.) at 0.6 wt %, 1 wt %, 2 wt %, 3.8 wt % and 5.7 wt % respectively with respect to the whole weight, and then performing photo-polymerization to cause phase-separation similarly to the manner of the experimental example 1.

Also in this experimental example, the liquid crystal and the epoxy resin were sufficiently dissolved in each other. It was confirmed that, in the composite materials of the display devices containing 0.6 wt % to 3.8 wt % epoxy resins, each liquid crystal maintained the cholesteric phase even after the phase-separation of the composite material. It can be considered as follows. Since the epoxy resin has such a nature that performs cation polymerization, it is not cured by irradiation of ultraviolet rays under existence of the photo-polymerization initiator which is an initiator for radical polymerization, and exists in such a state that it is dissolved in the phase-separated liquid crystal. Further, it can be considered that addition of the epoxy resin reduces the average refractive index of the liquid crystal, and thus improves matching between the average refractive index of the liquid crystal and the refractive index of the ultraviolet-curing resin. When resin having a high refractive index is used, it is required only to add an additional material which increases the average refractive index of the liquid crystal.

Figure 5:
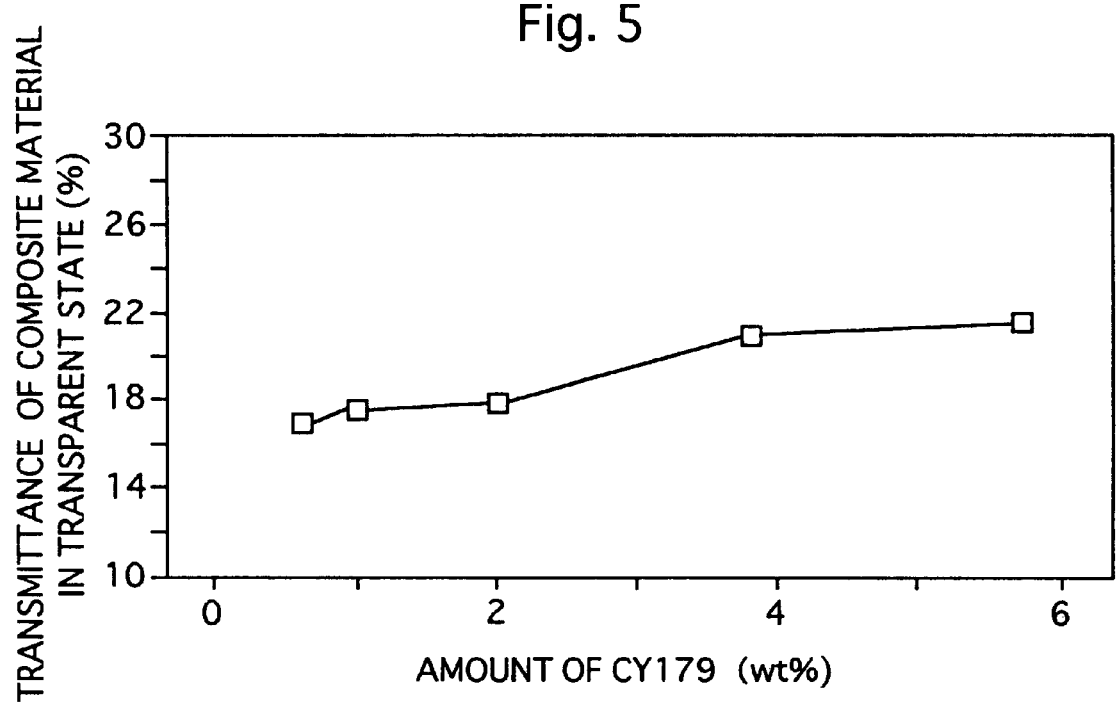
FIG. 5 shows a magnitude of influence of an amount of an epoxy resin on a transmittance of a composite material in a transparent state.

Transmittances of visible light of the respective devices in the transparent state were measured similarly to the manner of the experimental example 1. The results are shown in FIG. 5. It can be understood from FIG. 5 that the transmittance was improved in accordance with increase of the amount of the epoxy resin. However, the device containing 5.7 wt % epoxy resin did not maintain the transparent state and returned to the scattered state even when a pulse voltage was applied thereto, and thus it did not exhibit the bistability. Thereby, it can be understood as follows. By addition of an appropriate amount of material which is soluble with the cholesteric liquid crystal, keeps apart from production of polymer and maintains the cholesteric phase of the liquid crystal, the transmittance in the transparent state is improved. However, an excessive amount of the additional material impairs the memory effect of the composite material.

In this experimental example, the epoxy resin has been exemplified as an additional material other than the polymerization initiator, which is compatible with the liquid crystal. However, other material can be used to achieve a similar effect, provided that it is soluble with the liquid crystal, keeps apart from production of polymer, is optically isotropic and does not exert a strong influence on properties of the liquid crystal.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be constructed as being included therein.

What is claimed is:

1. A composite material retained between a pair of plates at least one of which is transparent, said composite material comprising:
   (a) polymer domains formed on at least one of said plates, said polymer domains forming at least one space thereamong;
   (b) a cholesteric liquid crystal which fills the space; and
   (c) an additional material which is dissolved in said cholesteric liquid crystal and maintains a cholesteric phase of said liquid crystal and bistability of a focal conic state and a planar state of said liquid crystal.

2. The composite material as claimed in claim 1, wherein the content of said polymer is 10 percent by weight or more relative to the composite material.

3. The composite material as claimed in claim 1, wherein a selective reflection wavelength of said liquid crystal exists in an infrared range.

4. The composite material as claimed in claim 1, wherein said liquid crystal is a chiral nematic liquid crystal including a nematic liquid crystal and a chiral material.

5. The composite material as claimed in claim 1, wherein said additional material is contained at a rate of 1 to 6 percent by weight relative to the composite material.

6. The composite material as claimed in claim 1, wherein said polymer domains and said cholesteric liquid crystal are formed by a phase separation process.

7. A composite material retained between a pair of plates at least one of which is transparent comprising:
   (a) polymer domains connecting said plates, said polymer domains forming at least one space thereamong;
   (b) a cholesteric liquid crystal which fills the space; and
   (c) an additional material which is dissolved in said cholesteric liquid crystal and maintains a cholesteric phase of said liquid crystal and bistability of a focal conic state and a planar state of said liquid crystal.

8. The composite material as claimed in claim 7, wherein said polymer domains and said cholesteric liquid crystal are formed by a phase separation process.

9. A composite material comprising:
   (a) polymer domains which provide effective form-retention for said composite material, said polymer domains forming at least one space thereamong;
   (b) a cholesteric liquid crystal which fills up the space; and
   (c) an additional material which is dissolved in said cholesteric liquid crystal and maintains a cholesteric phase of said liquid crystal and bistability of a focal conic state and a planar state of said liquid crystal.

10. The composite material as claimed in claim 9, wherein said polymer domains and said cholesteric liquid crystal are formed by a phase separation process.

11. A display device comprising:
   a pair of electrically conductive plates, at least one of which is transparent;
   a composite material retained between said plates; and
   an electric power source applying an electric voltage across said plates, wherein said composite material includes:
      (a) polymer domains formed on at least one of said plates, said polymer domains forming at least one space thereamong;
      (b) a cholesteric liquid crystal which fills the space; and
      (c) an additional material which is dissolved in said cholesteric liquid crystal and maintains a cholesteric phase of said liquid crystal and bistability of a focal conic state and a planar state of said liquid crystal.

12. The display device as claimed in claim 11, wherein the content of said polymer is 10 percent by weight or more relative to the composite material.

13. The display device as claimed in claim 11, wherein said electric power source selectively applies high and low pulse voltages.

14. The display device as claimed in claim 13, wherein said composite material exhibits an opaque state when said power source applies the low pulse voltage and exhibits a transparent state when said power source applies the high pulse voltage.

15. The display device as claimed in claim 11, wherein each of said plates includes a substrate material and an electrically conductive material formed thereon, at least one of said substrate materials and the corresponding electrically conductive material are transparent, and said electrically conductive materials are opposed to said composite material.

16. The display device as claimed in claim 11, wherein a selective reflection wavelength of said liquid crystal exists in an infrared range.

17. The display device as claimed in claim 11, wherein said additional material is contained at a rate of 1 to 6 percent by weight relative to the composite material.

18. The display device as claimed in claim 11, wherein said polymer domains and said cholesteric liquid crystal are formed by a phase separation process.

19. A composite material retained between a pair of plates at least one of which is transparent, said composite material comprising a polymer phase and a liquid crystal phase, said liquid crystal phase comprising a liquid crystal which exhibits a cholesteric characteristic and an additional material, said additional material being dissolved in said cholesteric liquid crystal and maintaining the cholesteric characteristic of said liquid crystal and bistability of a focal conic state and a planar state of said liquid crystal.

20. The composite material as claimed in claim 19, wherein the content of a polymer of said polymer phase is at least 10 percent by weight relative to the composite material.

21. The composite material as claimed in claim 19, wherein a selective reflection wavelength of said liquid crystal exists in an infrared range.

22. The composite material as claimed in claim 19, wherein said liquid crystal is a chiral nematic liquid crystal including a nematic liquid crystal and a chiral material.

23. The composite material as claimed in claim 19, wherein said additional material is contained at a rate of 1 to 6 percent by weight relative to the composite material.

24. The composite material as claimed in claim 19, wherein said polymer phase and said liquid crystal phase are formed by a phase separation process.

* * * * *